(12) United States Patent
Yang et al.

(10) Patent No.: US 11,937,060 B2
(45) Date of Patent: Mar. 19, 2024

(54) SURFACE SOUND-EMITTING APPARATUS AND ELECTRONIC DEVICE

(71) Applicant: Goertek Inc., Shandong (CN)

(72) Inventors: Xinfeng Yang, Shandong (CN); Fenglei Zu, Shandong (CN)

(73) Assignee: Goertek, Inc., Shandong (CN)

( * ) Notice: Subject to any disclaimer, the term of this patent is extended or adjusted under 35 U.S.C. 154(b) by 385 days.

(21) Appl. No.: 17/297,518

(22) PCT Filed: Dec. 28, 2018

(86) PCT No.: PCT/CN2018/124944
§ 371 (c)(1),
(2) Date: May 27, 2021

(87) PCT Pub. No.: WO2020/107621
PCT Pub. Date: Jun. 4, 2020

(65) Prior Publication Data
US 2022/0014852 A1  Jan. 13, 2022

(30) Foreign Application Priority Data
Nov. 27, 2018 (CN) .......................... 201811427202.9

(51) Int. Cl.
*H04R 7/04* (2006.01)
*G02F 1/1335* (2006.01)
*H04R 1/02* (2006.01)
*H04R 7/18* (2006.01)

(52) U.S. Cl.
CPC .......... *H04R 7/04* (2013.01); *G02F 1/133528* (2013.01); *H04R 1/028* (2013.01); *H04R 7/18* (2013.01); *G02F 2201/50* (2013.01); *H04R 2440/07* (2013.01); *H04R 2499/15* (2013.01)

(58) Field of Classification Search
None
See application file for complete search history.

(56) References Cited

U.S. PATENT DOCUMENTS

2006/0140437 A1* 6/2006 Watanabe .............. H04R 7/045
                                                                    381/431
2014/0333181 A1* 11/2014 Wang .................... B06B 1/0603
                                                                    310/328
2015/0117679 A1* 4/2015 Wang .................... H04R 7/045
                                                                    381/162

(Continued)

FOREIGN PATENT DOCUMENTS

CN          203896474 U      10/2014
CN          106792404 A       5/2017

*Primary Examiner* — Harry S Hong
(74) *Attorney, Agent, or Firm* — Baker Botts, LLP

(57) ABSTRACT

Disclosed are a surface sound-emitting apparatus and an electronic device. The surface sound-emitting apparatus comprises an exciter, a vibrating part and a connection element, wherein the connection element is of a sheet-like structure, the vibrating part is disposed on the connection element, the exciter is disposed on the vibrating part, an edge of the connection element is configured to connect to the remaining portion of a surface of an electronic device, the connection element and the remaining portion of the surface together constitute the surface, the connection element is configured to provide an elastic recovery force, and the exciter is configured to provide a driving force.

11 Claims, 2 Drawing Sheets

(56) References Cited

U.S. PATENT DOCUMENTS

2015/0201257 A1* 7/2015 Zhou ............... H04R 7/045
                                              381/152
2015/0304745 A1* 10/2015 Fromel ............ H04R 7/045
                                              381/162

* cited by examiner

SURFACE SOUND-EMITTING APPARATUS AND ELECTRONIC DEVICE

CROSS-REFERENCE TO RELATED APPLICATIONS

This application is a National Stage of International Application No. PCT/CN2018/124944, filed on Dec. 28, 2018, which claims priority to Chinese Patent Application No. 201811427202.9, filed on Nov. 27, 2018, both of which are hereby incorporated by reference in their entireties.

TECHNICAL FIELD

The present invention relates to the technical field of electro-acoustic conversion, and more specifically, to a surface sound-emitting apparatus and an electronic device.

BACKGROUND

A traditional screen sound-emitting apparatus or panel sound-emitting apparatus typically comprises one or more exciters. An exciter is installed on a screen or panel used for sound-emitting, or directly installed on a retaining frame of an electronic device such as a mobile phone. The exciter itself undergoes a certain deformation or displacement to drive the screen or panel to deform or displace, thereby realizing sound radiation.

Loudness of the sound radiation is closely related to driving force, radiation area and vibration quality of a vibration. The radiation area is increased since the screen or panel emits sound as a whole. However, as the radiation area increases, the vibration mass will also increase, which requires a greater driving force for driving. This will increase power of the exciter and cost of the sound-emitting apparatus.

In addition, a more powerful exciter has a larger volume, which is not conducive to the miniaturization of the electronic device.

Therefore, it is necessary to provide a new technical solution to solve the above technical problems.

SUMMARY

An object of the present invention is to provide a new technical solution for a surface sound-emitting apparatus.

According to a first aspect of the present invention, a surface sound-emitting apparatus is provided. The surface sound-emitting apparatus comprises an exciter, a vibrating part and a connection element, wherein the connection element is of a sheet-like structure, the vibrating part is disposed on the connection element, the exciter is disposed on the vibrating part, an edge of the connection element is configured to connect to the remaining portion of a surface of an electronic device, the connection element and the remaining portion of the surface together constitute the surface, the connection element is configured to provide an elastic recovery force, and the exciter is configured to provide a driving force.

Optionally, the connection element has an area larger than that of a side of the vibrating part for connecting with the connection element, and the vibrating part is arranged in the middle of the connection element to form an annular edge on the connection element.

Optionally, an outer surface of the connection element is flush with the remaining portion of the surface.

Optionally, the exciter comprises a piezoelectric exciter, a moving coil exciter, a moving iron exciter, a moving magnetic exciter or a magnetostrictive exciter.

Optionally, the connection element is made of a polymer material.

Optionally, the connection element has a Young's modulus less than or equal to 6080 Mpa, and a density less than or equal to 1130 kg/m$^3$.

According to another embodiment of the present disclosure, an electronic device is provided. The electronic device comprises a housing and a screen connected to the housing, the housing or the screen formed with a mounting hole thereon and being the remaining portion of a surface, a part of the housing or a part of the screen configured to surround the mounting hole being connection part, the mounting hole provided with the above surface sound-emitting apparatus therein, and the connection element connected to the connection part.

Optionally, the connection part is provided with a concave annular step structure in which the connection element is embedded.

Optionally, the connection element has an elastic coefficient smaller than that of the housing or the screen.

Optionally, the screen is provided thereon with the mounting hole and comprises a first liquid crystal screen and a first transparent protective layer arranged outside the first liquid crystal screen, the connection element is a second transparent protective layer, the vibrating part is a second liquid crystal screen, the second transparent protective layer has an elastic coefficient smaller than that of the first transparent protective layer, and the first transparent protective layer and the second transparent protective layer are connected, and the first liquid crystal screen and the second liquid crystal screen are jointly used for image display.

According to an embodiment of the present disclosure, the exciter vibrates and drives the vibrating part to vibrate, thereby directly radiating the sound outwards. The vibration direction is perpendicular to the main surface of the vibrating part, such as the front or back surface. The vibrating part vibrates as a part of the surface on which it is located, rather than the entire single-sided surface vibrating, such that the surface sound-emitting apparatus has a smaller radiation area, reduced driving force required for vibration, and reduced power of the exciter required for the vibration of the vibrating part.

Other features and advantages of the invention will become clear from the following detailed description of exemplary embodiments of the invention with reference to the drawings.

BRIEF DESCRIPTION OF THE DRAWINGS

The accompanying drawings incorporated in the specification and constituting a part of the specification show embodiments of the present invention, and is used for illustration of the principle of the present invention.

DESCRIPTION FOR REFERENCE SIGNS

Figure 1:
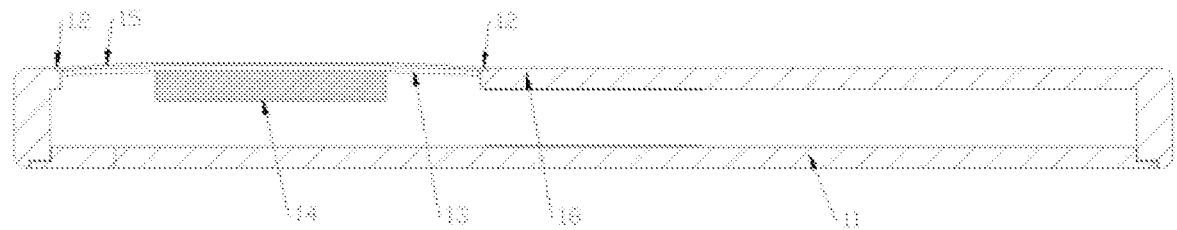
FIG. 1 is a cross-sectional view of an electronic device according to an embodiment of the present disclosure.

11: housing; 12: annular edge; 13: vibrating part; 14: exciter; 15: connection element; 16: first liquid crystal screen; 17: second liquid crystal screen; 18: the remaining portion of the surface; 2 first transparent protective layer; 22: second transparent protective layer; 23: annular step structure.

DETAILED DESCRIPTION

Various exemplary embodiments of the invention will now be described in detail with reference to the drawings. It should be noted that: unless specifically stated otherwise, the relative arrangement of components and steps, numerical expressions, and numerical values set forth in these embodiments do not limit the scope of the invention.

The following description of at least one exemplary embodiment is actually merely illustrative, and in no way serves as any limitation on the invention and its application or use.

The technologies, methods, and devices known to those of ordinary skill in the relevant fields may not be discussed in detail, but where appropriate, the technologies, methods, and devices should be regarded as part of the specification.

In all examples shown and discussed herein, any specific values should be interpreted as exemplary only and not as limitations. Therefore, other examples of the exemplary embodiment may have different values.

It should be noted that similar reference numerals and letters indicate similar items in the following drawings, so once an item is defined in one drawing, it does not need to be further discussed in subsequent drawings.

Figure 2:
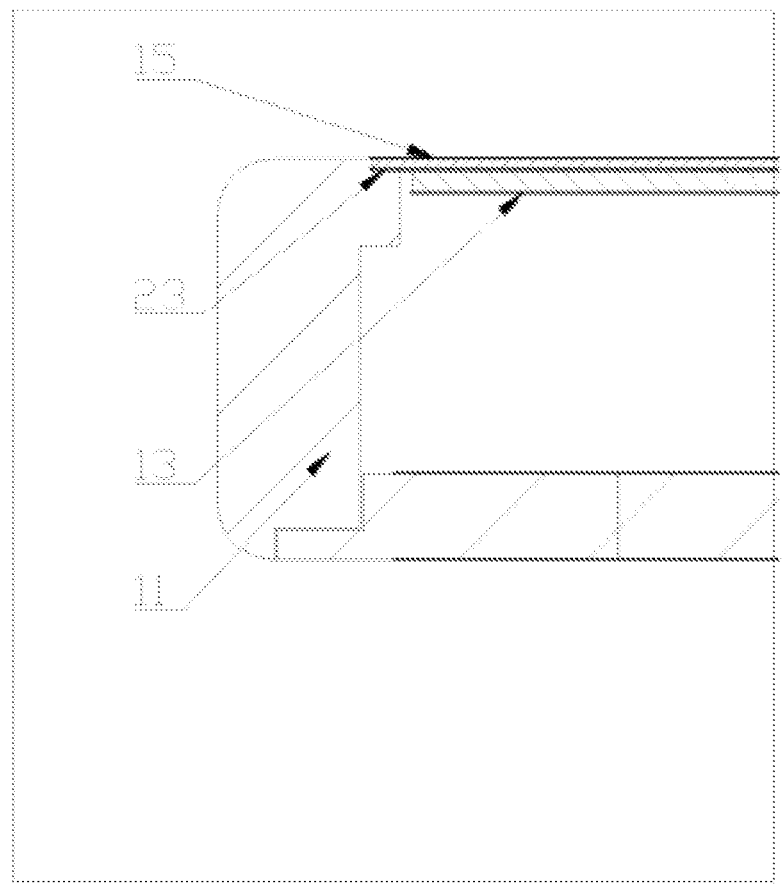
FIG. 2 is a partial enlarged view of FIG. 1.

According to an embodiment of the present disclosure, a surface sound-emitting apparatus is provided. As shown in FIGS. 1-2, the surface sound-emitting apparatus comprises an exciter 14, a vibrating part 13, and a connection element 15. The connection element 15 is of a sheet-like structure. The vibrating part 13 is arranged on the connection element 15. The exciter 14 is arranged on the vibrating part 13. Edges of the connection element 15 is configured to connect with the remaining portion 18, such as the housing 11 and/or the screen, of the surface of the electronic device. The connection element 15 and the remaining portion 18 of the surface together constitute the surface of the electronic device. The connection element 15 is configured to provide an elastic restoring force to restore the vibrating part 13 to its original position. The exciter 14 is configured to provide a driving force to deviate the vibrating part 13 from the original position to vibrate.

For example, the vibrating part 13 is of a sheet-like structure, and may be a circular sheet, a rectangular sheet, or a racetrack-shaped sheet. The sheet-like structure has a good sound-emitting effect. The vibrating part 13 is arranged between the exciter 14 and the connection element 15. The connection element 15 covers one surface of the exciter 14. For example, the exciter 14 is bonded to the middle of the vibrating part 13 and the vibrating part 13 is bonded to the connection element 15 by adhesive or double-sided tape. The vibration direction of the exciter 14 is perpendicular to the main surface of the vibrating part 13.

For example, the vibrating part 13 is made of inorganic non-metallic materials, metallic materials, or polymer materials. Preferably, the vibrating part 113 has a Young's modulus above 2000 MPa, and a density below 2.7 g/cm3. The vibrating part 13 within this range has the characteristics of high structural strength and light weight, can effectively reduce the partition vibration of the surface sound-emitting apparatus, and needs a small driving force during the vibration.

For example, the exciter 14 comprises a piezoelectric exciter 14, a moving coil exciter 14, a moving iron exciter 14, a moving magnet exciter 14, or a magnetostrictive exciter 14. The exciter 14 is fixed at the middle position of the vibrating part 13 by adhesive or double-sided tape. The exciter 14 receives an electric signal from an external circuit, thereby generating the vibration. The exciter 14 drives the vibrating part 13 to vibrate, thereby radiating the sound outwards.

The connection element 15 has elasticity so as to return the vibrating part 13 to the initial position. For example, the material of the connection element 15 is a polymer material. The polymer material comprises the material such as PI, PP, PEN, PPT. All the above materials may provide an elastic restoring force.

The connection element 15 is of a sheet-like structure, for example, a round sheet, a rectangular sheet or a racetrack-shaped sheet. Since the connection element 15 is located on the surface of the electronic device after the assembly is completed, the sheet-like structure may keep the appearance of the electronic device being good.

In one example, the connection element 15 has a Young's modulus less than or equal to 6080 Mpa, and a density less than or equal to 1130 kg/m$^3$. The connection element 15 in this ratio range has the characteristics of good elasticity and light weight.

In addition, the connection element 15 may also play a role of dustproof, waterproof and the like.

In the embodiment of the present disclosure, the exciter 14 vibrates and drives the vibrating part 13 to vibrate, thereby directly radiating the sound outwards. The vibration direction is perpendicular to the main surface of the vibration part 13. The vibrating part 13 vibrates as a part of the surface on which it is located, rather than the entire single-sided surface vibrating, such that the surface sound-emitting apparatus has a smaller radiation area, the driving force required for vibration is reduced, and the power of the exciter 14 required for the vibration of the vibrating part 13 is reduced.

In addition, due to the reduction of the radiation area, the electronic device does not need to leave a large space margin, which facilitates to achieve the thin and light design of the electronic device.

In addition, due to the reduction of the radiation area, it reduces the mass of the vibrating part 13, and significantly improves the electro-acoustic conversion efficiency and the vibration sensitivity.

In an example, as shown in FIG. 1, the connection element 15 has an area larger than that of the side of the vibrating part 13 for connecting with the connection element 15. The vibrating part 13 is arranged in the middle of the connection element 15 to form an annular edge 12 on the connection element 15. The annular edge 12 is connected to the remaining portion 18 of the surface, and increases the contact area of the connection element 15 such that the connection between the connection element 15 and the remaining portion 18 of the surface becomes stronger.

In one example, the outer surface of the connection element 15 is flush with the remaining portion 18 of the surface, which makes the appearance of the electronic device good.

According to another embodiment of the present disclosure, an electronic device is provided. As shown in FIGS. 1-4, the electronic device comprises a housing 11 and a screen connected to the housing 11. There is a mounting hole formed on the housing 11 or the screen. The housing 11 or the screen is the remaining portion 18 of the surface. The part configured to surround the mounting hole of the housing 11 or the screen is regarded as a connection part. The above-mentioned surface sound-emitting apparatus is arranged in the mounting hole. The connection element 15 is connected to the connection part. For example, the edge of the connection element 15 is bonded to the connection part by double-sided tape or an adhesive. The exciter 14 and the hole wall of the mounting hole form a gap to avoid the hole wall from interfering with the exciter 14.

In an example, as shown in FIG. 2, the connection part is provided with a concave annular step structure 23. The connection element 15 is embedded in the annular step structure 23. The annular step structure 23 is arranged around the mounting hole. For example, the annular edge 12 is embedded in the annular step structure 23. The annular step structure 23 may play a role of positioning, such that the connection position of the connection element 15 is more accurate.

In an example, the connection element 15 has an elastic coefficient smaller than that of the housing 11 or the screen, which may reduce the impact of the elastic deformation of the housing 11 or the screen on the vibration of the surface sound-emitting apparatus, such that the surface sound-emitting apparatus has a better sound-emitting effect.

Figure 3:
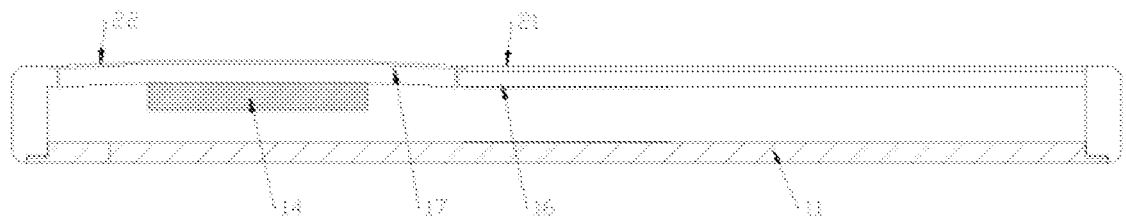
FIG. 3 is a cross-sectional view of an electronic device according another embodiment of the present disclosure.
Figure 4:
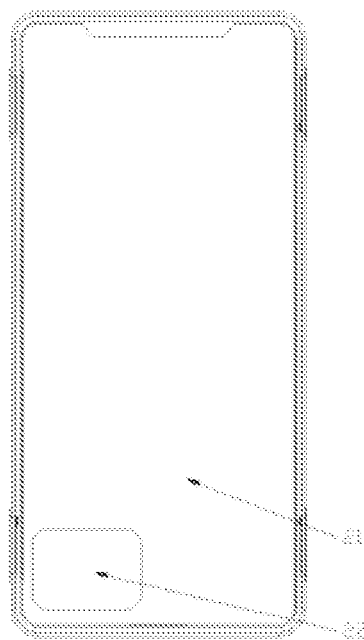
FIG. 4 is a front view of an electronic device according to another embodiment of the present disclosure.

In an example, as shown in FIGS. 3-4, mounting holes are provided in the screen. The screen comprises a first liquid crystal screen 16 and a first transparent protective layer 21 disposed outside the first liquid crystal screen 16. The outer side refers to a side distal from the inner cavity of the electronic device. The first liquid crystal screen 16 and the first transparent protective layer 21 are arranged in parallel.

The connection element 15 is a second transparent protective layer 22. The vibrating part 13 is a second liquid crystal screen 17. The second transparent protective layer 22 is arranged in parallel with the second liquid crystal screen 17. The elastic coefficient of the second transparent protective layer 22 is smaller than that of the first transparent protective layer 21. The first transparent protective layer 21 is connected to the second transparent protective layer 22. The first liquid crystal screen 16 and the second liquid crystal screen 17 are used jointly for image display. The first liquid crystal screen 16 and the second liquid crystal screen 17 are LED screens or LCD screens.

In this example, it is possible that the first transparent protective layer 21 and the second transparent protective layer 22 are bonded together by a double-sided tape or an adhesive. It is also possible that the first transparent protective layer 21 and the second transparent protective layer 22 are integrally formed transparent material. A softening treatment is performed on a part of the transparent material to reduce the elastic coefficient, thereby forming the second transparent protective layer 22. The portion other than the second transparent protective layer 22 is the first transparent protective layer 21.

The method of softening treatment comprises thinning the second transparent protective layer 22, such that the second transparent protective layer 22 has a thickness smaller than that of the first transparent protective layer 21. A smaller thickness may reduce the elastic coefficient of the second transparent protective layer 22, such that the vibrating part 13 has a better vibration effect.

In this example, a part of the screen is used for vibration and sound-emitting, instead of the entire screen for sound-emitting. The direction of sound radiation is toward the user, such that the user has a better listening effect.

In addition, the surface sound-emitting apparatus is used as a part of the screen to display images, which makes the coordination of images and sounds smooth.

In other examples, the electronic device is provided with a plurality of surface sound-emitting apparatuses. The plurality of surface sound-emitting apparatuses radiate the sound in different directions to form a stereo effect. This makes the sound effect of the electronic device more excellent.

Although some specific embodiments of the present invention have been described in detail through examples, those skilled in the art should understand that the above examples are only for illustration and not for limiting the scope of the present invention. It should be understood by a person skilled in the art that the above embodiments can be modified without departing from the scope and spirit of the present invention. The scope of the present invention is defined by the attached claims.

The invention claimed is:

1. A surface sound-emitting apparatus, comprising an exciter, a vibrating part and a connection element, wherein the connection element comprises a sheet-like structure, the vibrating part is disposed on the connection element, the exciter is disposed on the vibrating part, an edge of the connection element is configured to connect to a remaining portion of an electronic device surface, the connection element and the remaining portion of the electronic device surface together constitute the electronic device surface, wherein the connection element is configured to provide an elastic recovery force, and the exciter is configured to provide a driving force.

2. The surface sound-emitting apparatus of claim 1, wherein, the connection element has an area larger than that of a side of the vibrating part for connecting with the connection element, and the vibrating part is arranged in the middle of the connection element to form an annular edge on the connection element.

3. The surface sound-emitting apparatus of claim 1, wherein, an outer surface of the connection element is flush with the remaining portion of the electronic device surface.

4. The surface sound-emitting apparatus of claim 1, wherein the exciter is selected from the group consisting of a piezoelectric exciter, a moving coil exciter, a moving iron exciter, a moving magnetic exciter or a magnetostrictive exciter.

5. The surface sound-emitting apparatus of claim 1, wherein, the connection element is made of a polymer material.

6. The surface sound-emitting apparatus of claim 1, wherein, the connection element has a Young's modulus less than or equal to 6080 Mpa, and a density less than or equal to 1130 kg/m$^3$.

7. An electronic device, comprising a housing and a screen connected to the housing, the housing or the screen being formed with a mounting hole thereon and configured as the remaining portion of an electronic device surface, a part of the housing or a part of the screen configured to surround the mounting hole being a connection part, the mounting hole provided with the surface sound-emitting apparatus according to claim 1 therein, and the connection element connected to the connection part.

8. The electronic device of claim 7, wherein, the connection part is provided with a concave annular step structure in which the connection element is embedded.

9. The electronic device of claim 7, wherein, the connection element has an elastic coefficient smaller than that of the housing or the screen.

10. The electronic device of claim 7, wherein the screen is provided thereon with the mounting hole and comprises a first liquid crystal screen and a first transparent protective layer arranged outside the first liquid crystal screen;
- the connection element is a second transparent protective layer;
- the vibrating part is a second liquid crystal screen;
- the second transparent protective layer has an elastic coefficient smaller than that of the first transparent protective layer;
- the first transparent protective layer and the second transparent protective layer are connected, and
- the first liquid crystal screen and the second liquid crystal screen are jointly used for image display.

11. The electronic device of claim 1, wherein the vibrating part vibrates as a part of the electronic device surface on which it is located, rather than the entire single-sided surface vibrating.

* * * * *